United States Patent [19]

Gillis

[11] Patent Number: 4,977,195

[45] Date of Patent: Dec. 11, 1990

[54] ELASTOMERS

[75] Inventor: Herbert R. Gillis, Sterrebeek, Belgium

[73] Assignee: Imperical Chemical Industries PLC, London, England

[21] Appl. No.: 248,870

[22] Filed: Sep. 28, 1988

[30] Foreign Application Priority Data

Oct. 16, 1987 [GB] United Kingdom ............... 8724348

[51] Int. Cl.$^5$ .............................................. C08G 18/66
[52] U.S. Cl. .................................... 521/155; 521/159; 521/163; 521/167; 521/170; 521/174; 521/176; 528/44; 528/59; 528/61; 528/64; 528/66; 528/68; 528/76; 528/77; 528/78; 528/85
[58] Field of Search ....................... 528/76, 77, 78, 61, 528/64, 66, 68, 44, 59, 85; 521/155, 159, 163, 170, 174, 176, 167

[56] References Cited

U.S. PATENT DOCUMENTS

| | | | |
|---|---|---|---|
| 3,222,300 | 12/1965 | Loew | 521/174 |
| 3,441,588 | 4/1969 | Wagner et al. | 521/163 |
| 4,523,025 | 6/1985 | Cuscurida et al. | 560/26 |
| 4,595,743 | 6/1986 | Laughner et al. | 528/73 |
| 4,677,136 | 6/1987 | Rasshofer et al. | 521/159 |
| 4,738,991 | 4/1988 | Narayan | 521/124 |
| 4,794,129 | 12/1988 | Gillis, Jr. et al. | 521/121 |

*Primary Examiner*—Maurice J. Welsh
*Assistant Examiner*—Rabon Sergent
*Attorney, Agent, or Firm*—Richard A. Rowe

[57] ABSTRACT

An elastomer which is the reaction product of:
(a) at least one organic polyisocyanate;
(b) at least one compound containing a plurality of isocyanate-reactive groups and having a molecular weight greater than 600, and
(c) at least one chain extender having a molecular weight not exceeding 600, wherein at least one of components (a) and (b) is or includes a compound having a molecular weight greater than 600 and at least two reactive sites, at least one of which sites contains at least two isocyanate or isocyanate-reactive groups which are separated one from another by a chain of from 2 to 30 atoms and from the reactive groups in other reactive sites by a chain of more than 30 atoms.

7 Claims, No Drawings

ELASTOMERS

This invention relates to elastomers and more particularly to elastomers having a polyurethane and/or polyurea basis.

The manufacture of solid or foamed elastomers having a polyurethane and/or polyurea basis is well established. In the usual manufacturing process, an organic polyisocyanate is reacted with a polymeric polyol or polyamine and a chain extender which is commonly a low molecular weight diol, a diamine or water.

In the production of solid elastomers, the polyisocyanates and polymeric polyols or polyamines used are largely difunctional because the use of conventional branched components can adversely affect the elastomer physical properties, for example tear and tensile strength. In the manufacture of elastomeric foams, it is common to use polymeric triols, for example propylene oxide adducts of trimethylolpropane. These triols can be regarded as having three terminal isocyanate-reactive sites each consisting of a single hydroxyl group, each hydroxyl in a given molecule being approximately equidistant from the other two hydroxyls.

It has now been found that elastomers having improved properties can be obtained from reactive components which include at least one branched component in which the branching is situated at or near to the ends of polymeric molecules.

Thus, according to the invention, there is provided an elastomer which is the reaction product of:
(a) at least one organic polyisocyanate;
(b) at least one compound containing a plurality of isocyanate-reactive groups and having a molecular weight greater than 600, and
(c) at least one chain extender having a molecular weight not exceeding 600, wherein at least one of components (a) and (b) is or includes a compound having a molecular weight greater than 600 and at least two reactive sites, at least one of which sites contains at least two isocyanate or isocyanate-reactive groups which are separated one from another by a chain of from 2 to 30 atoms and from the reactive groups in other reactive sites by a chain of more than 30 atoms.

For the purpose of the present invention, references to the number of atoms present in a chain indicate the number of atoms present in the backbone of the chain but not hydrogen atoms or other substituents attached to backbone atoms.

Thus, in a poly(propylene oxide) chain, the carbon and oxygen atoms constituting the backbone of the chain are counted but not the attached hydrogen atoms or the atoms present in the methyl substituents.

Organic polyisocyanates which may be present in component (a) particularly include aromatic polyisocyanates and polyisothiocyanates or mixtures thereof, especially the diisocyanates conventionally used in the production of polyurethane or polyurea elastomers. Particular mention may be made of toluene diisocyanates, diphenylmethane diisocyanates and polymethylene polyphenylene polyisocyanates in their various known commercial forms. Especially preferred polyisocyanates include 4,4'-diphenylmethane diisocyanate (pure MDI) and its mixtures with the 2,4'-isomer. Also useful are polyisocyanates, for example those based on MDI, which have been modified by the introduction of urethane, allophanate, urea, biuret, carbodiimide or uretonimine groups.

Component (a) may also be or include a polyisocyanate having a molecular weight greater than 600 of the general formula:

$$A_m(X)_n \qquad (1)$$

wherein A represents a chain of more than 30 atoms, m represents an integer of at least 1, X represents an isocyanate group containing residue and n is an integer of at least 2, at least one of the residues represented by X containing at least two isocyanate groups separated one from another by a chain of from 2 to 30 atoms and the sum of the residues represented by X constituting less than 50% of the total molecule on a weight basis.

Polyisothiocyanates corresponding to the polyisocyanates of Formula 1 may also be used.

As examples of the types of chain represented by A in the polyisocyanates of Formula 1, there may be mentioned polyethers, polyesters, polysiloxanes, polyamides, polycarbonates and hydrocarbons in which at least 70 mole percent of the backbone atoms are not incorporated into aromatic ring systems. More than one type of chain may be present in the same molecule. Particularly important chains are polyether chains containing at least 80% of propylene oxide units on a weight basis.

The polyisocyanates of Formula 1 preferably have molecular weights greater than 1800 with each A being a chain of more than 70, preferably more than 100, atoms in length. Especially preferred polyisocyanates have molecular weights in the range 3000 to 100,000.

It is also preferred that the ratio of the molecular weight of the polyisocyanaté of Formula 1 to the number of isocyanate group containing residues X in the molecule is not less than 800, more preferably not less than 1000 and most preferably not less than 1200. It is desirable that at least two of these contain at least two isocyanate groups per residue with a preferred maximum of four isocyanate groups in any residue. The overall isocyanate equivalent weight of the polyisocyanates of Formula 1 is preferably not less than 500, more preferably not less than 750, and most preferably not less than 850.

The isocyanate groups within an isocyanate group containing residue are suitably separated by a chain of not more than 25 atoms.

Examples of polyisocyanates of Formula 1 include products obtained by reacting polymeric polyamines such as polyether diamines with organic diisocyanates under conditions such that the initially formed urea-modified isocyanates are converted to biuret-modified isocyanates. The polymeric chain will then terminate in isocyanate group containing residues of the formula:

$$\begin{array}{c} \text{CO—NH—R—NCO} \\ | \\ \text{—N} \\ | \\ \text{CO—NH—R—NCO} \end{array} \qquad (2)$$

wherein R represents a divalent hydrocarbon radical, for example a methylene-bis-phenylene radical. Such structures may be obtained, for example, by reacting a polymeric diamine with at least 2 equivalents of diisocyanate or polyisocyanate. In particular, diamines of which one amino-group at least is a primary amino-group may be preferably reacted with at least two equivalents of aromatic diisocyanate or polyisocyanate, at temperatures of from 50° C. to 100° C.

Similar products may be obtained by reacting diisocyanates with polymeric polyimines, for example the polyimines obtained by reacting polyether diamines with aliphatic aldehydes or ketones.

Similarly, polymeric polyols such as polyether polyols may be reacted with organic diisocyanates under conditions such that the initially formed urethane-modified isocyanates are converted to allophanate-modified isocyanates. The polymeric chain will then terminate in isocyanate group containing residues of the formula:

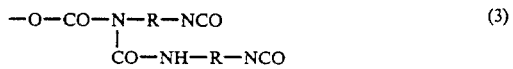

(3)

wherein R is as defined above.

Structures analogous to the above may be obtained by "capping" polymeric polyols such as polyether polyols with glycidol and then reacting the capped polyols with an excess of an organic diisocyanate, for example MDI. The polymeric chain will then terminate in isocyanate group containing residues of the formula:

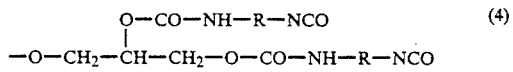

(4)

wherein R is as defined above.

Mixtures of polyisocyanates of Formula 1 may be used.

Compounds containing a plurality of isocyanate-reactive groups which may be present in component (b) particularly include the active hydrogen containing materials having molecular weights greater than 600 which have been used in the preparation of polyurethane and polyurea elastomers. Such materials include polyols and/or polyamines based on polyethers, polythioethers, polyesters (including polyactones, polycarbonates and polyesteramides), polyacetals, polysiloxanes, polyamides and polyolefines and copolymers thereof. Mixtures of isocyanate-reactive materials, for example mixtures of polyols and/or polyamines may be used. The functionality of such materials must be appropriate to the production of elastomeric products; their selection in this respect will present no difficulty to the skilled person. Component (b) may also be or include an isocyanate-reactive compound having a molecular weight greater than 600 of the general formula:

$$B_p(Y)_q \quad (5)$$

wherein B represents a chain of more than 30 atoms, p represents an integer of at least 1, Y represents an isocyanate-reactive group containing residue and q is an integer of at least 2, at least one of the residues represented by Y containing at least two isocyanate-reactive groups separated one from another by a chain of from 2 to 30 atoms and the sum of the residues represented by Y constituting less than 50% of the total molecule on a weight basis.

As examples of the types of chain represented by B in the isocyanate-reactive compounds of Formula 5, there may be mentioned polyethers, polyesters, polysiloxanes, polyamides, polycarbonates and hydrocarbons in which at least 70 mole percent of the backbone atoms are not incorporated into aromatic ring systems. Particularly important chains are polyether chains containing at least 80% of propylene oxide units on a weight basis.

The isocyanate-reactive compounds of Formula 5 preferably have molecular weights greater than 1800 with each B being a chain of more than 70, preferably more than 100, atoms in length. Especially preferred compounds have molecular weights in the range 2000 to 100,000.

It is also preferred that the ratio of the molecular weight of the isocyanate-reactive compound of Formula 5 to the number of isocyanate-reactive group containing residues Y in the molecule is not less than 600, more preferably not less than 800, and most preferably not less than 1000. It is desirable that at least two of these contain at least two isocyanate-reactive groups per residue with a preferred maximum of 4 isocyanate-reactive groups in any residue. The overall equivalent weight, with respect to the total number of isocyanate-reactive groups, is preferably not less than 500, more preferably not less than 750, and most preferably not less than about 850.

Isocyanate-reactive groups which may be present in the isocyanate-reactive group containing residues include, for example, hydroxyl, carboxyl, thiol, primary and secondary amino groups and mixtures thereof. The isocyanate-reactive groups within an isocyanate-reactive group containing residue are suitably separated by a chain of not more than 25, preferably not more than 15 and especially not more than 5 atoms.

Useful compounds of Formula 5 include compounds in which all of the isocyanate-reactive groups are hydroxyl groups, at least two of the isocyanate-reactive group containing residues Y containing at least one primary hydroxyl group. Other useful compounds include those wherein at least two of the isocyanate-reactive group containing residues Y contain at least one primary and/or secondary aliphatic and/or aromatic amino group.

Examples of isocyanate-reactive compounds of Formula 5 include polyols obtained by the oxyalkylation of polyether diamines, for example polyols of the formula:

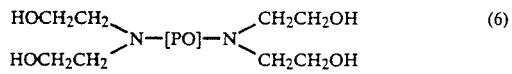

(6)

wherein PO represents a polyoxypropylene chain, and the corresponding products obtained by oxyalkylation of polyether triamines or higher polyamines.

Other examples of isocyanate-reactive compounds of Formula 5 include polyols obtained by end-capping polyether polyols, for example polyoxypropylene diols or triols, with glycidol. Further examples include the products of reacting polyether polyols successively with epichlorohydrin and diethanolamine.

Still further isocyanate-reactive compounds of Formula 5 include polycarboxylic acids obtained by reacting a polyoxyalkylene polyol, for example a polyoxypropylene diol or triol, with a cyclic anhydride of a polycarboxylic acid having at least three carboxyl groups, for example trimellitic acid anhydride or pyromellitic acid dianhydride.

The compounds of Formula 5 may be used as such in making the elastomers of the invention or, alternatively, they may in certain cases be reacted with diisocyanates to form polyisocyanates of Formula 1 which may also be used in making the elastomers.

Mixtures of isocyanate-reactive compounds of Formula 5 may be used.

Chain extenders which may be used as component (c) in making the elastomers of the invention include those conventionally used in the manufacture of polyurethane and polyurea elastomers. Thus, there may be mentioned water, hydrazine, hydrazides, diols, for example ethylene glycol and butanediol, and polyamines, especially aromatic polyamines.

Aromatic polyamines useful as chain extenders in the reaction systems of the invention particularly include diamines, especially those having molecular weights from about 100 to about 400, preferably between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3'-dimethyl-5,5'-diethyl-4,4'-diaminodiphenylmethane, 3,3',5,5'-tetraisopropyl-4,4'-diaminodiphenylmethane and the like and mixture thereof.

Particularly useful reaction systems for use in preparing the elastomers of the invention comprise the following component:
(a) at least one organic polyisocyanate;
(b) at least one compound containing a plurality of isocyanate-reactive groups and having a molecular weight greater than 600, and
(c) at least one chain extender comprising at least one aromatic polyamine having an aromatically bound primary and/or secondary amine functionality of from about 1.8 to about 3.0, an average molecular weight of from about 100 to about 400 and wherein at least 50 mole per cent of the species comprising said polyamine are diamines, wherein at least one of components (a) and (b) is or includes a compound having a molecular weight greater than 600 and at least two reactive sites, at least one of which sites contains at least two isocyanate or isocyanate-reactive groups wherein which are separated one from another by a chain of from 2 to 30 atoms and from the reactive groups in other reactive sites by a chain of more than 30 atoms.

The elastomers of the invention may take the form of solid mouldings, coatings, fibres or flexible foams all of which may be made using conventional techniques and equipment. Thus, the elastomer formulations may contain other conventional ingredients of such formulations, for example catalysts, fillers, pigments, plasticisers, fire retardants, internal mould release agents, blowing agents and surfactants. The preparation of the elastomers by RIM techniques is of particular importance.

In the RIM (reaction injection moulding) process for the production of elastomers, two highly reactive liquid streams are impingement mixed and rapidly injected into a mould cavity. In producing the elastomers of the present invention, one stream will comprise the organic polyisocyanate and the other stream will comprise the isocyanate-reactive components (b) and (c). The techniques and equipment used in RIM processes have been fully described in the prior art, for example in U.S. Pat. Nos. 4,218,543, 4,396,729, 4,433,067, 4,444,910, 4,448,904 and 4,474,901.

The invention is illustrated but not limited by the following Examples in which all parts and percentages are by weight. In all the following Examples the formulation described were processed on a Krauss Maffei RIMSTAR 155 machine under the following condition:
Component temperature: 45° C.
Component mixing ratio: as specified
Machine total output: 160 Kg/Min
Mixing pressure: 180 bars
Demould time: 30 seconds
Mould: steel plaque: 600×900×3 mm
Mould temperature: 110° C.

EXAMPLE 1

A polyisocyanate composition containing a polyether terminating in isocyanate group-containing residues of Formula 2 wherein R is a methylene-bis-phenylene radical was prepared by reacting 56.1 parts of diphenylmethane diisocyanate (80/20, 4,4'-/2,4'-isomers) with 43.9 parts of a polyether diamine of molecular weight 2000 (Jeffamine D2000) at 50° C. and then for 1 hour at 80° C. The polyisocyanate composition so obtained (100 parts), having an NCO content of 16.4% and an average functionality of 2.24, was reacted with 54.1 parts of an isocyanate-reactive composition comprising 48.5% by weight of a polyether diamine of molecular weight 400 (Jeffamine D400), 48.5% by weight diethyl tolylene diamine and 2.9% by weight of zinc stearate to give Elastomer 1.

For comparison, Elastomer 2 was prepared by reacting 73 parts of the same isocyanate-reactive component with 100 parts of a prepolymer, having an NCO content of 17.5% and an average functionality of 2.01, obtained by reacting 49.8 parts of 80/20 4,4'-/2,4'-MDI and 11.3 parts of uretonimine-modified MDI with 38.9 parts of polypropylene glycol of molecular weight 2000.

EXAMPLE 2

A polyisocyanate composition containing isocyanate group-containing residues of Formula 2 where R is a methylene-bis-phenylene radical was prepared by reacting 49.5 parts of 80/20 4,4'-/2,4'-MDI with 50.5 parts of a polyether diamine of molecular weight 2000 (Jeffamine D2000).

The polyisocyanate composition so obtained (100 parts), having an NCO content of 14.08% and an average functionality of 2.19, was reacted with 44.2 parts of an isocyanate-reactive composition comprising 48.3% by weight of a polyether diamine of molecular weight 400 (Jeffamine D400), 48.3% by weight of diethyl tolylene diamine and 3.4% by weight of zinc stearate to give Elastomer 3.

For comparison, Elastomer 4 was prepared by reacting 43.24 parts of the same isocyanate-reactive composition with 100 parts of a prepolymer, having an NCO content of 14.5% and an average functionality of 2.24, obtained by reacting 47 parts of 80/20 4,4'-/2,4'-MDI with 53 parts of an ethylene oxide tipped oxypropylated glycerol of molecular weight 5250.

As shown from Table 1, the elastomers 1, 2, 3 prepared according to the present invention display improved physical properties as compared with the mechanical properties of elastomer (4) prepared from a conventional glycerol-based polyol at the same nominal and link density: higher flexural modulus, improved shore D hardness, higher tensile strength, reduced heat SAG values, these improvements being not detrimental to the other properties - elongation at break, linear expansion coefficient or impact resistance.

The mechanical properties of the elastomers obtained were as follows:

TABLE 1

| Parameter | Unit | 1 | 2 | 3 | 4 | Method |
| --- | --- | --- | --- | --- | --- | --- |
| Flexural* Modulus | MPa | 1168 | 929 | 938 | 489 | ASTM D 790 |
| Specific Gravity | kg/m$^3$ | 1125 | 1092 | 1116 | 1131 | ASTM D 792 |
| Hardness | Shore D | 72 | 71 | 70 | 57 | ASTM D 2240 |
| Tensile* strength | kPa | 35900 | 36000 | 33467 | 28900 | ASTM D 412 |
| Elongation* at break | % | 140 | 182 | 95 | 127 | ASTM D 412 |
| Heat Sag* | 30' | 1 | 1.5 | 0.5 | 5.5 | ASTM |
|  | 60' | 3.5 | 2.5 | 1.5 | 9.0 | D 3769 - 1205 mm overhang - 160° C. |
| Coeff. of* linear thermal expansion | 10$^{-6}$/°K. | 111 | 135 | 147 | 131 | ASTM D 696 |
| Falling dart impact resistance | Joules +23° C. −20° C. | 54 23 | 36 10 | 52 31 | 44.5 28 | B.S./2782 Method 306 B |

Note:
All properties (*) were measured in a direction parallel to the direction of flow.

I claim:

1. An elastomer which is the reaction product of:
   (a) at least one organic polyisocyanate;
   (b) at least one compound containing a plurality of isocyanate-reactive groups and having a molecular weight greater than 600, and
   (c) at least one chain extender having a molecular weight not exceeding 600,
   wherein at least one of components (b) is a compound having at least two isocyanate-reactive group containing sites, at least one of which sites contains at least two isocyanate-reactive groups which are separated one from the other by a chain from 2 to 30 atoms and from another reactive site in said component by a chain of more than 30 atoms.

2. An elastomer according to claim 1 wherein component (b) is or includes an isocyanate-reactive compound having a molecular weight greater than 600 of the general formula:

$$B_p(Y)_q$$

wherein B represents a chain of more than 30 atoms, p represents an integer of at least 1, Y represents an isocyanate-reactive group containing residue and q is an integer of at least 2, at least one of the residues represented by Y containing at least two isocyanate-react groups separated one from another by a chain of from 2 to 30 atoms and the sum of the residues represented by Y constituting less than 50% of the total molecule on a weight basis.

3. An elastomer according to claim 2 wherein the isocyanate-reactive groups present in the isocyanate-reactive group containing residues are selected from hydroxyl, carboxyl, thiol, primary and secondary amino groups and mixtures thereof.

4. An elastomer according to claim 2 wherein the isocyanate-reactive compound is a polyol obtained by the oxyalkylation of a polyether diamine or triamine.

5. An elastomer according to claim 2 wherein the isocyanate-reactive compound is a polyol obtained by end-capping a polyether polyol with glycidol.

6. An elastomer according to claim 1 wherein the chain extender comprises an aromatic diamine having a molecular weight from about 100 to about 400.

7. A reaction system for use in producing an elastomer as defined in claim 1, said reaction system comprising the following components:
   (a) at least one organic polyisocyanate;
   (b) at least one compound containing a plurality of isocyanate-reactive groups and having a molecular weight greater than 600, and
   (c) at least one chain extender comprising at least one aromatic polyamine having an aromatically bound primary and/or secondary amine functionality of from about 1.8 to about 3.0, an average molecular weight of from about 100 to about 400 and wherein at least 50 mole per cent of the species comprising said polyamines are diamines, wherein at least one of components (b) is or includes a compound having a molecular weight greater than 600 and at least two reactive sites, at least one of which sites contains at least two isocyanate-reactive groups which are separated one from another by a chain of from 2 to 30 atoms and from the reactive groups in other reactive sites by a chain of more than 30 atoms.

* * * * *